UNITED STATES PATENT OFFICE.

FRIEDRICH KRAFFT AND ALFRED ROOS, OF HEIDELBERG, GERMANY.

PROCESS OF MAKING ETHER.

SPECIFICATION forming part of Letters Patent No. 516,766, dated March 20, 1894.

Application filed December 15, 1892. Serial No. 455,242. (No specimens.)

*To all whom it may concern:*

Be it known that we, FRIEDRICH KRAFFT, professor and doctor of philosophy, a subject of the King of Prussia, and ALFRED ROOS, a citizen of the United States of America, both residing at Heidelberg, in the Grand Duchy of Baden, German Empire, have invented new and useful improvements in preparing methyl ether, ethyl ether, and their homologues by the action of alcohols on benzene-sulfonic acid and other sulfonic acids or their esters, of which the following is a specification.

This invention has for its object to manufacture simple ethers, in particular methyl ether, ethyl ether, and their homologues and also mixed ethers, such as methyl-ethyl-ether, by the action of methyl alcohol, ethyl-alcohol and their homologues on benzene-sulfonic acid benzene-disulfonic acid, para-toluene-sulfonic acid, beta-naphtalene-sulfonic acids and all the other sulfonic acids or their ethers, which by their stability and other properties are suitable for the purpose.

The process is based on the following facts:—We have recently proved (:*Berichte* XXV, 2255:), that contrary to prior assumptions sulfonic-acid-ethers can quite generally be obtained by dissolving sulfonic chlorids in an excess of the corresponding alcohol and allowing them to stand at ordinary temperature. Benzene-sulfonic-acid-ethyl-ether, ($C_6H_5SO_2OC_2H_5$) for instance, is obtained as a liquid boiling at 150° centigrade under a pressure of fifteen millimeters from benzene sulfonic chlorid and ethyl alcohol, thus:—

$$C_6H_5SO_2Cl + C_2H_5OH = C_6H_5SO_2OC_2H_5 + ClH.$$

A thorough study of this reaction has demonstrated, that by heating this mixture free sulfonic acids are frequently obtained instead of sulfonic acid ethers. In this case the sulfonic acid ethers formed in the first instance are decomposed by a second molecule of alcohol and thus the free sulfonic acid is regenerated, and at the same time the corresponding ether obtained. So for instance, from benzene-sulfonic-acid-ethyl-ether and ethyl-alcohol, free benzene-sulfonic-acid and ethyl-ether are obtained by heating; thus:—

$$C_6H_5SO_2OC_2H_5 + C_2H_5OH = C_6H_5SO_2OH + C_2H_5OC_2H_5.$$

These facts are of practical value for the preparation of ethyl ether and its homologues, since for obtaining ether in many cases, it is not necessary to first prepare sulfonic acid ether in a pure condition; on the contrary the alcohol is allowed to flow into the sulfonic acid heated to a suitable temperature whereby a distillate of ether and water accompanied by unconverted alcohol is obtained at once, while sulfonic acid is continuously regenerated.

When ethyl alcohol, or strong spirits of wine, is added to benzene-sulfonic acid or to another sulfonic acid, care being taken to maintain the mixture in a state of lively boiling, say, at a temperature of from 135° to 145° centigrade ethyl ether and water will be found in the distillate, besides undecomposed alcohol.

The conversion of alcohol into ether takes place in two ways:—

I. $C_6H_5SO_2OH + C_2H_5OH = C_6H_5SO_2OC_2H_5 + HOH;$
II. $C_6H_5SO_2OC_2H_5 + C_2H_5(OH) = C_6H_5SO_2OH + C_2H_5OC_2H_5.$

Notwithstanding the resemblance of this process of producing ether to the usual method consisting in preparing ether from sulfuric acid and alcohol or strong spirits of wine and which did not appear susceptible of further improvements, the new method offers quite remarkable advantages.

As is commonly known, sulfuric acid is quite easily decomposed by heat owing to oxidizing processes in forming sulfurous acid, moreover sulfuric acid retains at the temperature of reaction a larger quantity of water than is suitable for the process of producing ether. In the old process the operation must therefore be interrupted as soon as a relatively small quantity of alcohol is added to the sulfuric acid. The sulfonic acids—in which a negative radical allied to the sulfonic group is substituted for the unstable hydroxyl group of free sulfuric acid, which latter is useless for the process of producing ether—differ from sulfuric acid by a stability very important for the purpose at the temperature of reaction with respect to the alcohol susceptible of oxidation. Moreover at the temperature of reaction sulfonic acids give off the water far more easily than sulfuric acid. A mixture of sulfonic acid and alcohol may therefore be maintained in a boiling state for days and alcohol continuously added without perceiving any notable alteration of the composition of the mixture or of the distillate. It is true that small quantities of some sulfonic acid ethers are slowly taken along with the superheated vapors, but the free sulfonic acid can be recovered without any loss from the distillate, after the removal of the ether and alcohol, by simple evaporation. Benzenesulfonic acid can in this manner convert, as has been proved by experiment, more than one hundred times its weight of ethyl alcohol into ethyl ether.

The new process is distinguished from the old one, not only by greater simplicity and continuity of working, whereby the relatively higher price of sulfonic acid is largely compensated for, but also by the greater purity of the product.

If to a suitably heated sulfonic acid, say to benzene-sulfonic acid at a temperature of about 150° centigrade, methyl alcohol is added, the gaseous methyl ether $CH_3O.CH_3$ escapes in a constant current. In the same way propyl ether $C_3H_7O.C_3H_7$ may advantageously be obtained directly from benzene sulfonic acid and propyl alcohol at about 130° centigrade. On the other hand for alcohols having a greater molecular weight it is advisable, on account of the lesser susceptibility to decomposition of the sulfonic acid ethers, to prepare the latter in a pure state prior to the production of ethers.

What we claim as new is—

1. The herein described process of manufacturing ethers, consisting in heating sulfonic acids or their ethers with alcohols.

2. The herein described process of manufacturing ethyl ether, consisting in heating benzene-sulfonic acid with ethyl alcohol.

In testimony whereof we have signed our names to this specification in the presence of two subscribing witnesses.

FRIEDRICH KRAFFT.
ALFRED ROOS.

Witnesses:
M. BESSLER,
JOSEF MENZ.